United States Patent [19]
Butcher

[11] Patent Number: 4,789,996
[45] Date of Patent: Dec. 6, 1988

[54] CENTER FREQUENCY HIGH RESOLUTION DIGITAL PHASE-LOCK LOOP CIRCUIT
[75] Inventor: James S. Butcher, Phoenix, Ariz.
[73] Assignee: Siemens Transmission Systems, Inc., Phoenix, Ariz.
[21] Appl. No.: 149,459
[22] Filed: Jan. 28, 1988
[51] Int. Cl.[4] .............................................. H04L 7/08
[52] U.S. Cl. ..................................... 375/120; 328/155
[58] Field of Search .................. 375/120, 87, 83, 118, 375/119; 331/1 R, 18, 1 A; 328/155

[56] References Cited
U.S. PATENT DOCUMENTS 4,385,396  5/1983  Norton ................................. 375/120
4,418,318  11/1983 Swagerty et al. ................... 375/120
4,574,243  3/1986  Levine ................................. 375/120

OTHER PUBLICATIONS
NEC Microcomputer Products 1987 Data Book, vol. 2 of 2, pp. 6-125, 6-26 and 6-127.

Primary Examiner—Robert L. Griffin
Assistant Examiner—Marianne Huseman
Attorney, Agent, or Firm—Jeffrey P. Morris

[57] ABSTRACT

A center frequency high resolution digital phase-lock loop circuit (CF HRDPLL) is described with an input clock reference frequency which is equal to the output phase-locked frequency. The output is derived from delaying the input clock a variable number of gate delays ranging from no delay to one period of the input clock. A shift register controls the number of gate delays. A 360 degree phase detector initializes the shift register to provide no delay when the output is delayed by almost one period of the input clock and a phase retard correction occurs. An advance correction from a no delay condition causes a fast shift to occur to locate one period of delay while the output is held at no delay. The output is then switched to slightly less than one period of phase delay to allow further phase advance corrections to occur. Gate delay variations due to process, voltage and temperature are compensated for to provide a relatively constant clock phase correction.

24 Claims, 6 Drawing Sheets

PHASE DETECTOR TIMING

FIGURE 4 B.

180 DEG INHIBIT CIRCUIT WAVEFORMS

FIGURE 5.

FIGURE 6. SOA SEQUENCER TIMING

FIGURE 7. CLK CORRECT CONTROL 12B WITH GATE DELAY COMPENSATION

CENTER FREQUENCY HIGH RESOLUTION DIGITAL PHASE-LOCK LOOP CIRCUIT

CROSS REFERENCE TO RELATED APPLICATION

James S. Butcher, U.S. Ser. No. 125,523 filed Nov. 25, 1987 titled High Resolution Digital Phase-Lock Loop Circuit, assigned to the same assignee as the present application.

BACKGROUND OF THE INVENTION

1. Field of the Invention.

The present invention relates generally to data communications and to clock recovery circuits useful in DS1, DS2 and DS3 telecommunications transmission equipment. The present invention relates specifically to the provision of an improved digital phase-locked loop for replacing analog phase-locked loops which use voltage controlled or tank-tuned oscillators. The present invention also relates to low jitter clock recovery circuits for an Integrated System Digital Network (ISDN) two wire bidirectional telecommunication interface between a telephone central office line terminal and subscriber network terminals, called an ISDN U interface. The invention is also applicable to high and low speed transmission multiplexers and subscriber line interface circuits (SLIC's).

2. Description of the Prior Art.

In the known prior art, digital phase-lock loops required a much higher input clock reference frequency than the desired output frequency to allow small clock phase adjustments to be made at the output. The input clock in such prior art systems is divided down to the required output frequency which can be phase corrected by a minimum of one input clock period. Typically a prior art digital phase-locked loop used in a data clock recovery circuit requires an input reference frequency 10 to 100 times the output clock frequency to provide the desired receiver signal-to-noise performance. For example, a low speed optical fiber telecommunications DS2 receiver with a 13.056 Mhz Manchester data sampling clock would require an input reference frequency of 208.9 Mhz (16 times the sampling clock frequency) to provide +/−4.8 nsec sampling resolution. Manchester encoding is non return-to-zero data which consists of a transition in the middle of each symbol where a one is represented as a + pulse followed by a − pulse and a zero is represented by a − pulse followed by a + pulse (or vice versa).

In a special application, such as an ISDN U interface echo cancelling clock recovery circuit for 80 Kbps, 2B1Q data, a minimum input clock reference frequency of 1000 times the bit rate (80 Mhz) is required to provide adequate cancellation of the transmitted signal and the return echo. 2B1Q data format is well known and consists of two binary bits mapped into one quaternary or four level symbol.

There are several disadvantages in using high (>25 Mhz) instead of low (<25 Mhz) frequency reference clocks for digital phase-locked loops. The high speed interface circuitry required is more costly, consumes more power, and generates more radio frequency interference. Also, the crystals used for the high frequency reference do not operate in the fundamental mode but rather in harmonic modes and are consequently less efficient and more costly. High frequency crystals are also more susceptible to frequency drift due to stray capacitance and humidity. Because of these problems, an analog VCO or tuned tank oscillator is generally used in such high frequency applications even though they require initial adjustment or trimming and drift with temperature.

In the aforementioned cross-referenced application Ser. No. 125,523, a low frequency reference clock is used as does the present invention, but the input clock reference therein must be slightly higher in frequency than the output phase-locked frequency. This can be a limitation in some applications where a standard crystal or external frequency is desired. Also large amounts of jitter cannot be tracked since the advance drift correction per bit time is much smaller than the retard correction. Output jitter is inherent in a high resolution digital phase locked loop to maintain phase-lock since continuous retards must occur.

The center frequency high resolution phase-locked loop of the present invention allows the use of an input frequency which is equal to the desired output phase-locked frequency while yielding output clock phase adjustments as small as two NAND gate propagation delays. For 2μ CMOS technology, this is about 4 nsec which is equivalent to a 250 Mhz reference clock with a conventional digital phase-locked loop. A DS2 Manchester data receiver requires only a 13.056 Mhz crystal to provide 4-nsec phase adjustments. An ISDN U interface clock recovery circuit could use a 10.24 Mhz crystal to also provide 4 nsec phase adjustments (1/125th of a bit period). The 10.24 Mhz phase corrected output is divided by 128 to derive the 80 Khz receive clock. The 10.24 Mhz clock is also used to drive digital signal processing hardware.

The center frequency phase-locked loop of the present invention uses an input clock reference which is centered at the frequency at which phase locking is to occur. This allows the use of standard crystals or available system clocks which are equal to or integer multiples of the phase-locked frequency. Equal advance and retard correction increments about the center frequency improve the ability to track large amounts of jitter such as required on standard telecommunications T1 repeaters. Also an accurate phase shift of the input clock reference can be maintained with no jitter and only occasional phase advance or phase retard corrections.

Digital phase-lock loop circuitry is generally well known in the prior art, as exemplified by U.S. Pat. Nos. 3,585,298, Timing Recovery Circuit with Two Speed Phase Correction; 3,646,452, Second Order Digital Phase-Lock Loop; 3,697,689, Fine Timing Recovery System; 3,777,272, Digital Second-Order Phase-Locked Loop; 4,288,874, Timing Data Reproduction System; and 4,400,817, Method and Means of Clock Recovery in a Received Stream of Digital Data.

A further example of the prior art is the digital phase-lock loop used in the NEC uPD9306/A CMOS hard-disk interface IC. This integrated circuit is described in the NEC Microcomputer Products 1987 Data Book Vol. 2 of 2, pages 6–125, 6–126 and 6–127. A delay line with ten 10 nsec taps is required by the described NEC IC, which is not as cost effective as the present invention and does not provide the resolution possible with the present invention, as ten external leads from the delay line must interface the NEC IC.

SUMMARY OF THE INVENTION

A center frequency high resolution digital phase-lock loop circuit is provided with an input clock reference frequency which is equal to the output phase-locked frequency. The output is derived from delaying the input clock a variable number of gate delays ranging from no delay to one period of the input clock. A shift register controls the number of gate delays. A 360 degree phase detector initializes the shift register to provide no delay when the output is delayed by almost one period of the input clock and a phase retard correction occurs. An advance correction from no delay causes a fast shift to occur to locate one period of phase delay while the output is held at no delay. The output is then switched to slightly less than one period of delay to allow further advance corrections to occur. Gate delay variations due to integrated circuit process, voltage and temperature are compensated for to provide a relatively constant clock phase correction.

It is therefore a primary object of the present invention to provide a center frequency high resolution digital phase lock loop for low speed fiber optic transmission telecommunications equipment.

It is another object of the present invention to provide a center frequency high resolution digital phase lock loop for use as an ISDN clock recovery circuit.

Another object of the present invention is to provide a center frequency high resolution digital phase lock loop in data communications or telecommunications application in which a digital phase lock loop can be used without the requirement of a high frequency reference.

Another object of the present invention is the provision of a center frequency high resolution digital phase lock loop circuit to implement a delay line wherein the delay is based upon a clock reference and established by a programmable percentage of the average net phase retard count.

The foregoing and other objects and advantages of the invention will become apparent with reference to the following detailed description of a preferred embodiment and to the accompanying drawings, wherein:

DESCRIPTION OF THE PREFERRED EMBODIMENT

Figure 1:
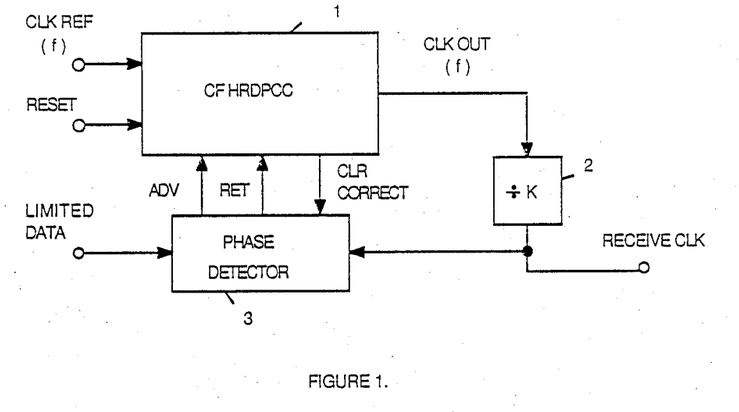
FIG. 1 is a block diagram of a high resolution digital phase lock loop.

FIG. 1 shows a block diagram of the center frequency high resolution digital phase-locked loop in a clock recovery circuit implementation. The circuit consists of a center frequency high resolution digital phase correction circuit 1, a divide by K circuit 2, and a phase detector circuit 3. The center frequency correction circuit 1 generates a CLK OUT signal (f) which is divided by K (K≧1) in frequency to produce a RECEIVE CLK phase locked to the data transitions of a LIMITED DATA input.

The clock reference input (CLK REF) to the phase correction circuit 1 is equal in frequency to the transmit clock frequency of the LIMITED DATA input. Advance or retard phase corrections are required to maintain phase lock to the LIMITED DATA signal transitions. The phase detector 3 generates an advance (ADV) or retard (RET) signal whenever the RECEIVE CLK is too late or too early, respectively, relative to the LIMITED DATA signal transitions. Each ADV or RET signal causes the phase lock loop to remove or introduce, respectively, a fixed delay (f) of CLK OUT and then output a clear correct signal (CLR CORRECT) which resets the phase detector ADV or RET output. The fixed delay (f) correction is in integer multiples of the propagation delay of two NAND gates, described hereinafter in greater detail. A RESET input to the phase control circuit 1 is used for initialization.

Figure 2:
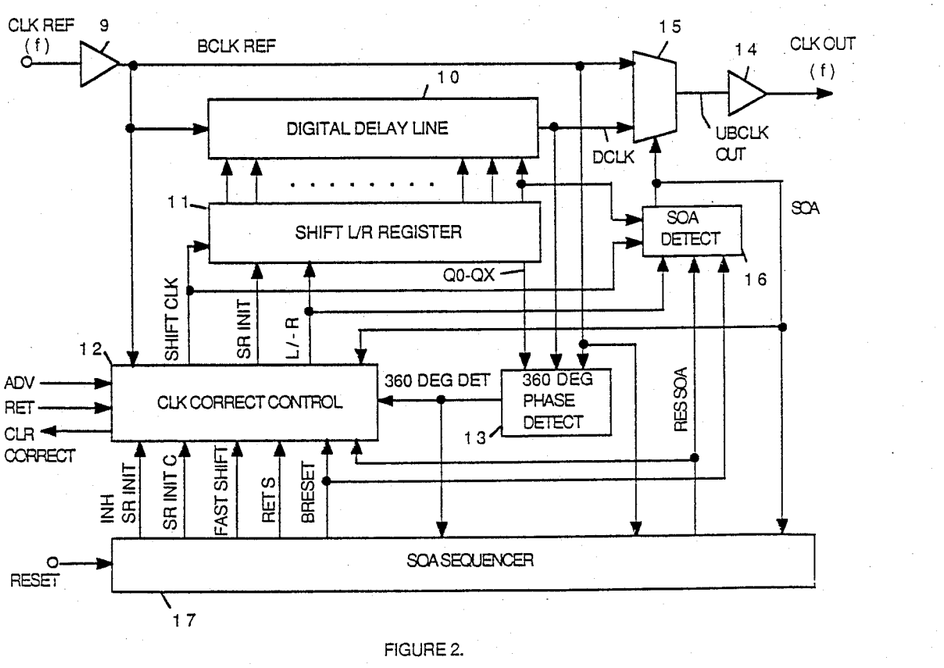
FIG. 2 is a block diagram of a high resolution center frequency high resolution digital phase correction circuit in accordance with the present invention.

FIG. 2 shows a block diagram of the center frequency high resolution digital phase correction circuit 1. The digital delay line 10 provides an incremental delay between 0 and 360 degrees of the CLK REF period. Shift register 11 selects the desired number of two NAND gate delays between 0 and n, where n is an integer greater than the CLK REF period divided by the worst case minimum two NAND gate delay. Clock correct control circuit 12 provides SHIFT CLK and left/right (L/−R) information to the shift register 11 based on the phase advance and phase retard input signals. In a high resolution mode each phase advance or phase retard input request produces a shift right or shift left clock edge, which removes or inserts, respectively, two NAND gates of delay at the DCLK output of digital delay line 10. After each phase advance or phase retard request is executed, CLR CORRECT occurs to reset the request.

The 360 degree phase detect circuit 13 outputs a 360 DEG DETECT signal to the clock correct control circuit 12 when the DCLK output has been retarded by 360 degrees of the CLK REF period. This generates a shift register 11 initialization signal (SR INIT) which establishes zero delay in the digital delay line 10. Additional phase retard corrections can then occur. Thus, even though the digital delay line 10 only provides up to one CLK REF period of actual delay, it appears as an infinite delay line at the DCLK signal for phase retard requests. The 360 degree phase detector 13 uses the Qo through Qx taps of the shift register 11 to prevent false 360 degree phase detects for x-1 left shift clocks after SR INIT occurs.

The shift overrun advance detector (SOA) 16 outputs an SOA signal to selector 15 and the SOA sequencer 17 when the DCLK signal is at zero delay and a phase advance occurs. This causes selector 15 to switch from the normally selected DCLK input to the BCLK REF input. While CLK OUT (f) provides a BCLK REF signal, the SOA sequencer overrides the ADV-RET inputs to clock correct control circuit 12 and executes a fast phase retard at the CLK REF frequency in search of 360 degree phase. Five signals from the SOA sequencer direct control of this fast phase retard: INH SR INIT, SR INIT C, FAST SHIFT, RET S, and RES SOA. When 360 degree phase detect occurs, the SOA sequencer commands several advance shifts to compensate for phase retard overshoot. RES SOA then occurs which inactivates shift overrun advance, switching selector 15 back to DCLK and allowing the ADV and RET signals to control the clock correct control circuit 12. Now additional advance corrections can occur with right shifts for one period of CLK REF where SOA again occurs and 360 degrees of phase delay is introduced.

The combination of the 360 degree phase detect and SOA detect circuits 13 and 16 respectively allow the digital delay line 10 to look like an infinite delay line for both phase advance and phase retard phase corrections. Although the infinite delay line is not simulated perfectly during 0 to 360 degree and 360 to 0 degree phase transitions, the error is insignificant in most applications.

The RESET input initializes the SOA sequencer 17 which outputs a BRESET signal to clock correct control circuit 12 and SOA detect circuit 16. Buffer 9 provides a buffered clock reference (BCLK REF) which is primarily required to drive the digital delay line 10. Buffer 14 buffers selector 15 output (UBCLK OUT) and provides drive capability for CLK OUT (f).

Figure 3:
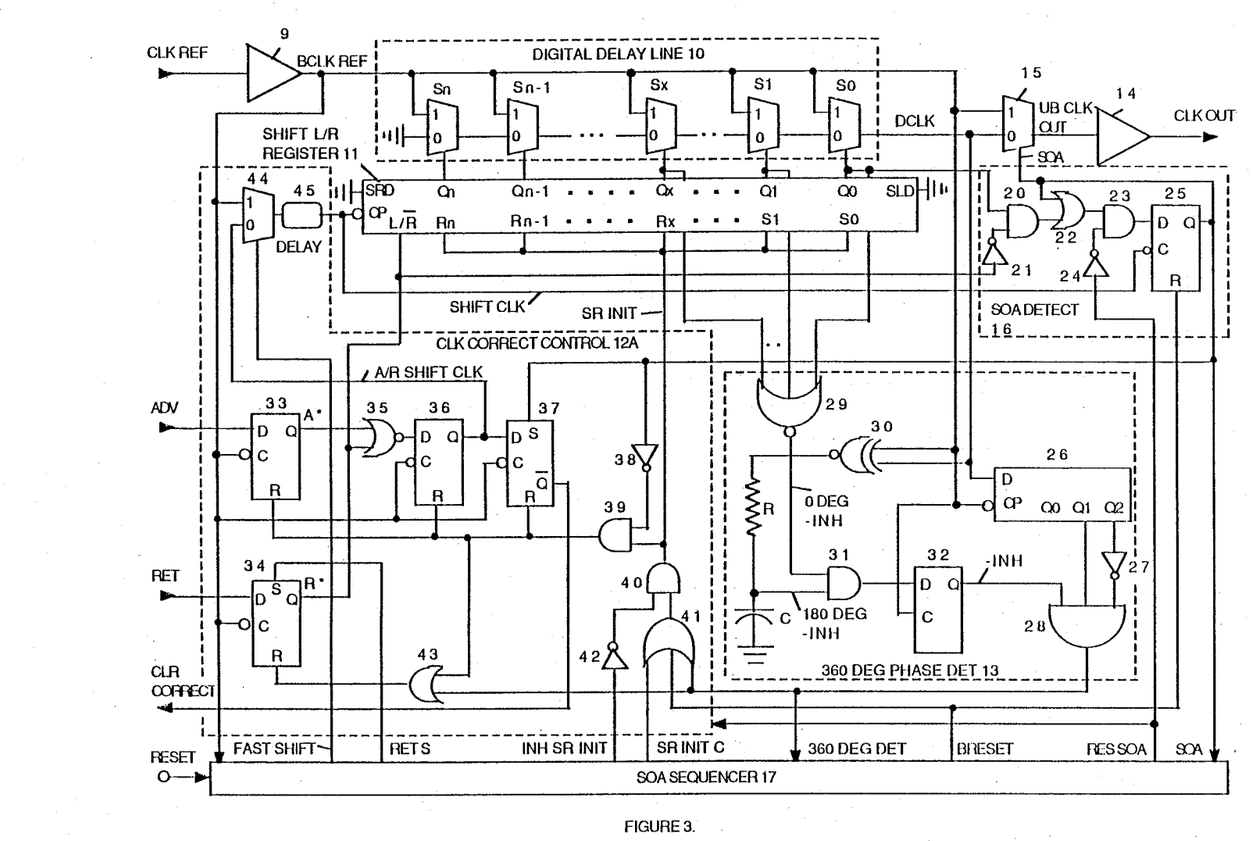
FIG. 3 is a schematic of the high resolution digital phase correction circuit described with reference to FIG. 2.

FIG. 3 shows a detailed embodiment of the correction circuit 1. The digital delay line 10 is implemented using a serial chain of 1 of 2 data selectors (S0-Sn). The selectors are non-inverting and can be implemented with NAND gates or with an equivalent such as AND-OR gates. A logic 0 or logic 1 on the bottom control lead selects the logic 0 or logic 1 input, respectively. The number of data selectors, n (not including S0), must be greater than the CLK REF period divided by the worst case minimum selector propagation delay. The Q outputs of shift register 11 control the selectors of the digital delay line 10.

The 360 degree phase detector 13 consists of a 360 degree positive edge detector including flip flop 26, inverter 27, AND gate 28, and an inhibit circuit which prevents false 360 degree phase detects. The inhibit circuit consists of a 0 DEG inhibit circuit comprised of Exclusive NOR gate 29, AND gate 31 and flip flop 32 and a 180 DEG inhibit circuit comprised of gates 30, 31 and flip flop 32.

Figure 4:
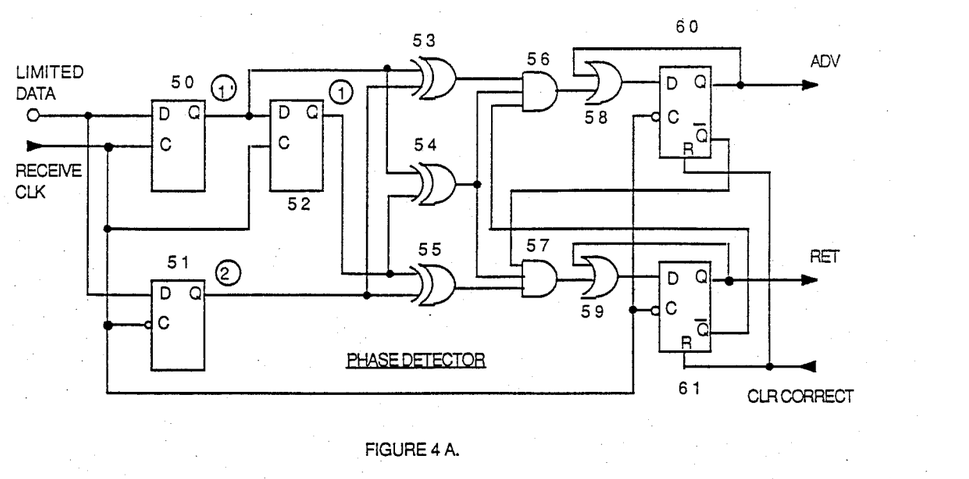
FIG. 4A is a phase detector circuit useful in connection with the present invention.
FIG. 4B is a series of timing diagrams useful in explaining the operation of the phase detector circuit described with reference to FIG. 4A.

The clock correct control circuit 12A is a shift clock and direction control circuit consisting of gates and flip flops 33 through 45, which provides an asynchronous phase advance and phase retard signal interface to the limited data phase detector 3 via the ADV, RET and CLR CORRECT signals. FIG. 4 shows an embodiment of a phase detector 3 which will be described hereinafter.

The shift overrun advance (SOA) detector 16 detects a shift right overrun which starts the SOA sequencer via the SOA signal. The SOA detector consists of gates and flip flop 20-25. The SOA sequencer 17 is a state machine which controls the clock correct control circuit 12A when searching for 360 degree delay.

The operation of the center frequency phase correction circuit 1 of FIG. 3 will now be described for (a) the reset state, (b) retard corrections from 0 to 180 degrees, (c) retard corrections from 180 to 360 degrees, (d) advance correction at 0 degrees and (e) advance corrections from 360 to 0 degrees.

RESET STATE OPERATION

If a reset pulse is applied to the SOA sequencer 17, all its outputs are forced to 0 and BRESET pulses high which resets flip-flops 25,33,34,36, and 37. This forces L/−R, A/R SHIFT CLK, and SOA low and CLR CORRECT high. Also SR INIT pulses high to initialize the shift register 11 outputs to all logic 0's except for Q0 and Q1 which are set to logic 1. In the reset state the digital delay line output (DCLK) is just the BCLK REF signal delayed by the S0 selector "1" input-to-output path. This is the zero degree phase reference of DCLK for the 360 degree phase detector circuit 13. Since SOA is low, DCLK passes through selector 15 to become UB CLK OUT.

Edge detector shift register 26 samples the DCLK signal at its D input on the falling edge of the BCLK REF signal. In the reset condition, the edge detector typically samples the digital delay line 10 output just before a falling edge. The shift register 26 thus typically contains all logic 1's, but due to worst case IC propagation delays all logic 0's or sporadic logic 0's and 1's could occur.

The 0 DEG −INH output of NOR gate 29 is low since Q0 & Q1=1. This forces the −INH lead low via AND gate 31 and D flip-flop 32 after a negative edge of BCLK REF occurs. The 360 DEG DET lead is also forced low via AND gate 28. Thus SR INIT is inhibited from pulsing high even if the edge detector detects positive edges. The state of the 180 DEG −INH lead is high, but is a "don't care" state since the output of AND gate 31 is forced low by the 0 DEG −INH lead.

On the first negative BCLK REF edge after the RESET input goes low, A/R SHIFT CLK goes high. On the second negative BCLK REF edge after the RESET input goes low, CLR CORRECT goes low which removes the reset on FIG. 4 flip-flops 60 and 61. The clock correct control circuit is now in the idle state ready to receive clock corrections.

PHASE RETARD CORRECTIONS 0 TO 180 DEGREES

When a high phase retard signal is received on the RET input from the phase detector 3, the 1/−R input to shift register 11 goes "high" on the next negative edge of buffer clock reference (BCLK REF) setting up a left shift. A/R SHIFT CLK goes "low" on the next negative edge of BCLK REF causing SHIFT CLK to go "low" after passing through selector 44 and delay 45. This shifts a pair of logic "1's" in shift register 11 at taps Q0 and Q1 to taps Q1 and Q2 and places a logic "0" into Qo which causes selector S1 to insert a delay of dT in the digital delay line 10 path from CLK REF to CLK OUT. All following rising and falling edges of CLK OUT will thus be delayed by an additional delay of dT.

The CLR CORRECT signal goes "high" on the third negative edge of BCLK REF to reset flip-flops 60 and 61 illustrated in the phase detector circuit of FIG. 4A and restores the idle state of flip-flops 33, 34, 36 and 37 on the following three negative edges of BCLK REF.

Errors in the CLK OUT signal are avoided during insertion of the dT delay by not changing the Q0 output of shift register 11 from logic "1" to logic "0" until both selector S0 inputs are at logic "0". This condition occurs after the BCLK REF "high" to "low" transition propagates through selector S1. The delay block 45 delay is chosen so that this condition is guaranteed under worst case conditions. The delay, if required, can be implemented with conventional inverters or gates. The leftmost logic "1" of the shifted pair of logic "1's" which was at Q1 before the shift, and now is at Q2, sets up the delay path which will be inserted upon each shift and completely isolates the digital delay line output from the data selector to the left.

Each new phase retard request received, causes the pair of "one's" in shift register 11 to shift left one position which adds an additional dT of delay to the CLK OUT signal. When the pair of logic one's are shifted Past Qx, the 0 DEG −INH line goes "high" since all logic "0's" are present on the inputs of NOR gate 29. The output of AND gate 31 then goes logic high assuming the 180 DEG −INH line is still high. After one CLK REF period, −INH goes high which enables the 360 degree detector 13.

The Qx tap is chosen to inhibit a positive edge detect which otherwise might occur near zero degree phase and cause a shift register initialize (SR INIT) before 360 degree phase delay is reached. With worst case maximum selector propagation delays determine the Q output where 360 degree phase dela is selected. Qx is preferably selected to be about two taps before this tap. This ensures that the zero degree inhibit circuit will never mask valid 360 degree detects.

RETARD CORRECTIONS 180 TO 360 DEGREES

Until CLK OUT is delayed by 180 degrees relative to BCLK REF, the edge detector shift register 26 will sample logic "1's" and thus Q0=Q1=Q2=1. When 180 degree phase delay occurs, logic "0's" will be sampled and thus Q0=Q1=Q2=0. The 180 degree inhibit circuit, comprised of gates 30 and 31, flip flop 32 and the illustrated resistor R and capacitor C inhibits positive edges which look like 360 degree phase detect edges (Q1=1, Q2=0) from causing a false SR INIT signal at 180 degrees instead of at 360 degrees delay. CLK REF jitter or variations in selector gate delays can cause the foregoing condition to occur.

EX-NOR gate 30 monitors the phase of BCLK REF and DCLK and charges capacitor C via resistor R to the average DC output voltage.

Figure 5:
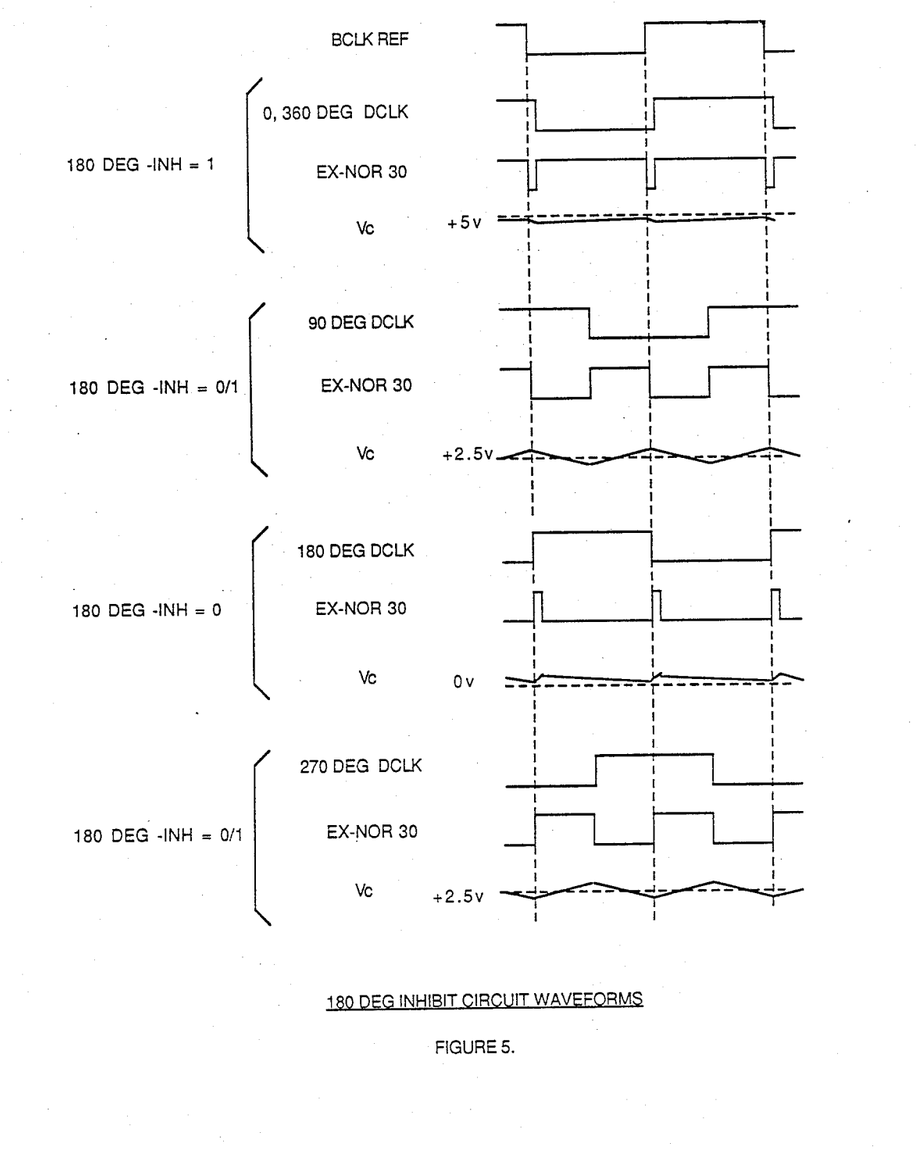
FIG. 5 is a series of waveforms useful in describing the 180 degree inhibit circuit operation of the present invention.

FIG. 5 shows the 180 degree inhibit circuit waveforms for the states 1, 0 or 1, 0, and 0 or 1 for the degrees of DCLK illustrated. The output of AND gate 31 and the −INH lead are logic low from about >90 degrees to <270 degrees of phase delay. This assumes that the input switching threshold of AND gate 31 is at 2.5 volts. Input threshold variation will not affect the performance of the inhibit circuit, although the inhibit phase zone about 180 degrees will increase or decrease with a high or low threshold, respectively. The inhibit phase zone will never include the phase near 360 (or 0) degrees. This ensures that the 180 degree inhibit function will never mask valid 360 degree detects. Note that the 180 degree inhibit function can overlap with the 0 degree inhibit function and normally will do so with worst case maximum selector delays.

The RC time constant is chose such that it is large enough to maintain a valid logic low when near 180 degrees of phase delay but small enough to not mask the 360 degree detect during fast retard with a worst case maximum average selector delay (minimum number of shifts to 360 degrees).

The EX-NOR, R and C 180 degree inhibit circuit will always accurately mask the edge detects near 180 degrees whether 180 degrees is approached with phase advance or phase retard corrections. Even if no corrections occur and the delay line delay decreases from >180 degrees to <180 degrees due to temperature variations, the positive edge detect will be masked. An all digital 180 degree inhibit circuit would not perform as well.

As additional retard corrections occur and 360 degree phase delay is approached, the edge detector shift register 26 outputs are 0 and the 360 degree detector is enabled. When Q1 of shift register 26 goes to logic 1, 360 degree delay has been detected. The Q1 low to high transition forces SR INIT "high" via AND gate 28, OR gate 41 and AND gate 40. Shift register 11 is initialized just as during reset with Q0=Q1=1 and Q2 through Qn=0. Taps Q0 and Q1 of shift register 11 force 0 DEG −INH low via NOR gate 29. SR INIT returns low when flip-flop 32 samples the low output of AND gate 31. The correction circuit has now completed a 0 to 360 and back to 0 degree phase cycle. The correction circuit is now ready for additional phase retard requests.

The Q0 output of shift register 26 is not used to allow metastable states to settle out during one period of CLK REF. The DCLK is asynchronous relative to the sampling clock, BCLK REF, due to the incremental delays of the digital delay line 10. A metastable state could Potentially delay the SR INIT pulse to occur after the BCLK REF returns high and cause an error condition in CLK OUT.

In order to avoid error conditions in CLK OUT, the BCLK REF input at the logic "1" inputs of selectors S1 and S0 must be low before the Q1 or Q0 outputs go high as a result of SR INIT pulsing high. The inherent worst case minimum delays of gates, flip flop and register 26, 28, 41, 40 and 11 respectively typically provide an adequate total delay to compensate for maximum high-to-low transition time of BCLK REF, input threshold differences or layout variations.

ADVANCE CORRECTION AT 0 DEGREES

An advance request at 0 degrees requires that one CLK REF period delay be found to allow shift advance corrections to occur without overrunning the end of the shift register 11. This is done by performing a fast retard shift under the control of the shift overrun-advance (SOA) sequencer 17.

When a high advance signal is received on the ADV input from phase detector 3, the L/−R input to shift register 11 stays low setting up a right shift. The A/R SHIFT CLK goes low on the next negative edge of BCLK REF causing SHIFT CLK to go low after passing through selector 44 and delay 45. This shifts the logic "1" at Q0 of shift register 11 to flip-flop 25 via gates 20, 22 and 23. This signal SOA (Q of flip flop 25) goes high and is held high via feedback through OR gate 22 and AND gate 23 until RES SOA goes high. Selector 15 connects BCLK REF to unbuffered clock out (UB CLK OUT). Flip-flop 37 is also set to hold CLR CORRECT low until the RES SOA signal goes high.

Figure 6:
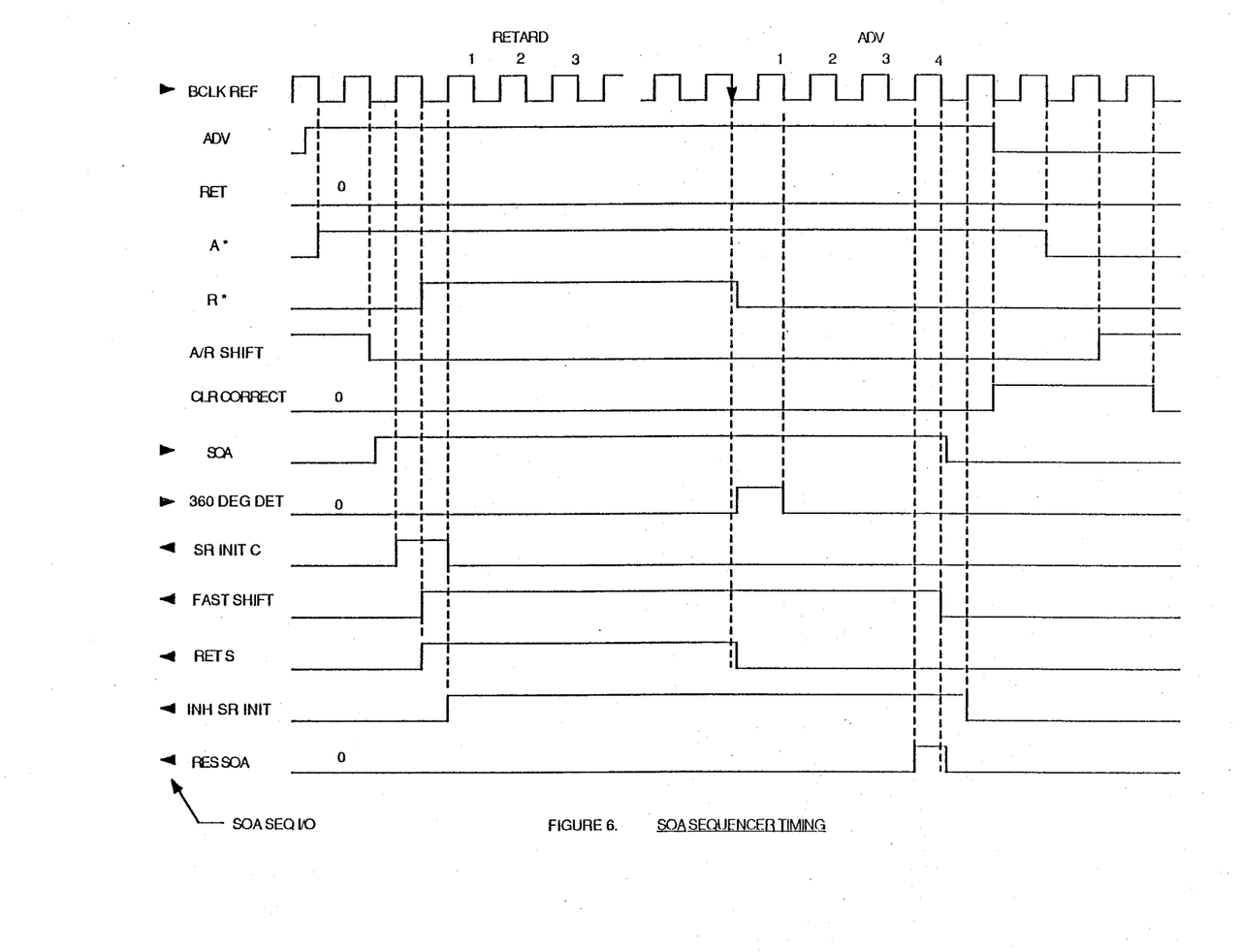
FIG. 6 is a series of waveforms diagrams useful in explaining the shift overrun advance sequencer timing of the present invention.

FIG. 6 shows the timing as waveform diagrams for the SOA sequencer 17. The SOA sequencer 17 begins its control sequence when the SOA signal goes high. The basic operation of the SOA sequencer 17 is as follows:

(1) SOA goes high.

(2) SR INIT C pulses high for one CLK REF period to initialize shift register 11.

(3) While SR INIT'C is high, FAST SHIFT goes high which connects the SHIFT CLK to BCLK REF via selector 44 and delay 45. RET S also goes high which sets flip-flop 34 (Q=R*), resulting in L/−R of shift register 11 going high.

(4) When SR INIT C returns low, INH SR INIT goes high to prevent shift register initialization when 360 degree delay is reached.

(5) The next negative edge of SHIFT CLK after SR INIT C goes low, shifts the pair of 1's at Q1 and Q0 left by one tap. Each following negative edge of SHIFT CLK again shifts the pair of 1's left by one tap. While this fast retard shift occurs. CLK OUT remains connected to CLK REF via buffer 9, selector 15 and bufer 14.

(6) The fast retard shift continues with the 0 and 180 degree inhibit circuits functioning as described earlier. When the 360 DEG DET line pulses high, RET S goes low and flip-flop 34 (Q=R*) is reset via OR gate 43. The SR INIT does not occur at this time as INH SR INIT is still high.

(7) The next four negative edges of SHIFT CLK shift the pair of one's in shift register 11 right four taps. This compensates for the over-shoot which occurs due to the inherent two cycle delay in detecting 360 degree phase delay and ensures that DCLK will be early relative to BCLK REF so that with worst case gate delays, the 360 degree phase detector will not detect 360 degree delay.

(8) FAST SHIFT goes low when the fourth right SHIFT CLK occurs which forces SHIFT CLK low to stop shifting of shift register 11.

(9) RES SOA pulses high on the positive edge of BCLK REF before the fourth negative edge of SHIFT CLK occurs. When the fourth negative edge of SHIFT CLK occurs, SOA goes low which switches selector 15 to DCLK. No errors will occur during this switch since both BCLK REF and DCLK are low when the switch occurs.

(10) The set to flip-flop 37 goes low with SOA and on the next negative edge of BCLK REF the CLR CORRECT line goes high and clears the ADV and RET signals from the phase detector.

(11) INH SR INIT goes low a half cycle after SOA goes low to enable a future 360 degree detect to produce an SR INIT.

(12) When CLR CORRECT returns low the clock correct control circuit is ready to reeive another ADV or RET correction.

A maximum of n+11 CLK REF periods are required to complete the degree phase retard search, where n is the number of selectors less one. In most applications this delay will not significantly affect clock correction accuracy, particularly when K of the divide by K circuit 2 of FIG. 1 is large.

ADVANCE CORRECTIONS FROM 360 TO 0 DEGREES

Advance corrections from 360 to 0 degrees are performed essentially in the same manner as retard corrections except that the pair of logic one's in shift register 11 are shifted to the right instead of left. Each right shift removes a selector delay dT, which causes DCLK to advance relative to BCLK REF. The 0 to 180 degree inhibit circuits function the same as previously described for retard corrections.

Referring now to FIG. 4 A, a phase detector 3 which attempts to center the negative edge of the RECEIVE CLK between incoming or limited data transitions is shown. It is to be understood that this is only an example of one type of phase detector which may be used with the present invention. FIG. 4B shows the phase detector timing. Data flip-flops 52, 51 and 50 sample LIMITED DATA on the positive (sample 1), negative (center sample 2) and next positive (sample 1') edges of the RECEIVE CLK, respectively as illustrated. The three samples are provided to a logic circuit comprised of gates 53 to 57 for evaluation and the result is output as a phase ADV or phase RET information signal upon the negative update edge of the RECEIVE CLK. Flip-flops 60 and 61 latch and hold this information via OR gates 58 and 59 until CLR CORRECT occurs. The condition ADV=RET=1 is inhibited from occuring.

If sample 1 is different than sample 2, the RECEIVE CLK is early and the RET output goes high on the update sample. If sample 2 is different from sample 1', the RECEIVE CLK is late and the ADV output goes high on the update sample. The foregoing is illustrated by the FIG. 4B waveforms. In both cases the samples on either side of the center sample must be different or else phase ADV and phase RET remain low. This maintains improved center sampling and prevents unnecessary ADV−RET corrections when the limited data has bias distortion eg., where + data pulses are wider than − data pulses or vice versa.

The RECEIVE CLK is corrected in increments of dT to maintain the negative edge of RECEIVE CLK approximately centered between limited data transitions. The shift register 11 of the center frequency phase-lock loop will shift the pair of logic "1's" left or right as required to phase-lock the RECEIVE CLK to the incoming LIMITED DATA.

One preferred application of the center frequency phase-lock loop of the present invention shown in FIGS. 1 through 4 is in a Manchester data clock recovery circuit. This application uses the capability of the center frequency phase-lock loop to make small phase corrections to the output clock which is at the same frequency as the input CLK REF frequency. Referring again to FIG. 1, 6.528M bps limited Manchester data may be provided to phase detector 3. A 13.056 Mhz crystal can be used to generate CLK REF with a worst case duty cycle of 40–60%. CLK OUT is then divided by K=1 to yield the RECEIVE CLK. With reference to FIG. 3, the typical selector delay is assumed as 4 nsec +/−80% including process, temperature and voltage variations. The minimum and maximum selector delays are thus 0.8 nsec and 7.2 nsec, respectively.

The number of selectors required is determined by dividing the CLK REF period by the minimum selector delay or 76.593 nsec/0.8 nsec=95.7. An actual embodiment would use 97 selectors minimum to be on the safe side, so n=97. The Qx tap is determined by dividing the CLK REF period by the maximum selector delay and subtracting two for a safety margin. Thus 76.593 nsec/7.2 nsec−2=10.6−2=8.6. Qx would then equal Q8 to be on the safe side. The RC time constant of the 180 degree inhibit circuit should be approximately 100 nsec. The RC circuit values of R=25K ohm and C=4 pF would be appropriate.

The accuracy of center sampling is dependent on the duty cycle of CLK REF. With a 60–40% duty cycle a +/−10% sampling error can occur. The digital delay line 10 will not degrade the duty cycle of CLK REF at CLK OUT even if the selector NAND gate high-to-low and low-to-high propagation delays are not equal. Since two NAND gates are used in each selector, each selector has a total delay equal to the low-to-high plus high-to-low propagation delays for either type of input transition. If very accurate center sampling is required, CLK OUT should be divided by 2 (K=2) to eliminate any duty cycle inaccuracy. This of course doubles the required input frequency at CLK REF.

Another preferred embodiment and application of the present invention is an ISDN U interface clock recovery at the line terminal (LT), and ideally requires that CLK OUT be phase locked between 0 and 360 degrees relative to the CLK REF input with no jitter. Occasional small phase steps are required to track the slowly changing phase of the limited data transitions from the network terminals due primarily to cable temperature variations. The present invention is well suited for this application. The IC technology employed provides that the maximum selector delay provides an acceptably small phase step (<1/1000 baud period). This ensures that the far end signal from the network terminal NT can be extracted from a signal which also includes the near end line terminal LT transmitted and echo signals with a minimum of error.

Typically examplary ISDN U interface clock recovery specifications are:

| Transmission Line | Echo canceller with hybrid 2B1Q |
|---|---|
| Rcv baud rate | 80K +/− 5 ppm |
| CLK REF freq (f) | 10.24 Mhz (+/− 10 ppm) |
| CLK REF period | 97.652 nsec (40–60% duty cycle) |
| CLK OUT (f) | 10.24 Mhz +/− 5 ppm (when phase locked) |
| divided by K (FIG. 1) | K = 128 |
| RECEIVE CLK freq. | 80 Khz +/− 5 ppm |
| RECEIVE CLK period | 12.5 usec |
| 2 u CMOS selector delay | 4 nsec +/− 80% (0.8 nsec min, 7.2 nsec max) |

For the aforementioned application, LIMITED DATA as shown in FIG. 1 is actually zero crossing transition information from the four level 2B1Q signal derived via a zero crossing comparator. The phase detector 3 can be implemented with the circuit shown in FIG. 4A. An averaging advance-retard counter circuit can be inserted between the phase detector 3 ad center frequency phase-lock loop 1 to output only one correction request every few seconds. This provides the ability to track slow LIMITED DATA phase shifts due to cable temperature variations, while not following the high frequency jitter from the far end (NT).

To provide compatibility with the aforementioned Manchester data clock recovery circuit and also operation over CLK REF frequencies of 10 Mhz to 15 Mhz the number of selectors is chosen to equal 127 and Qx=Q7, R equals 25K ohms and C equals 4 pF.

Figure 7:
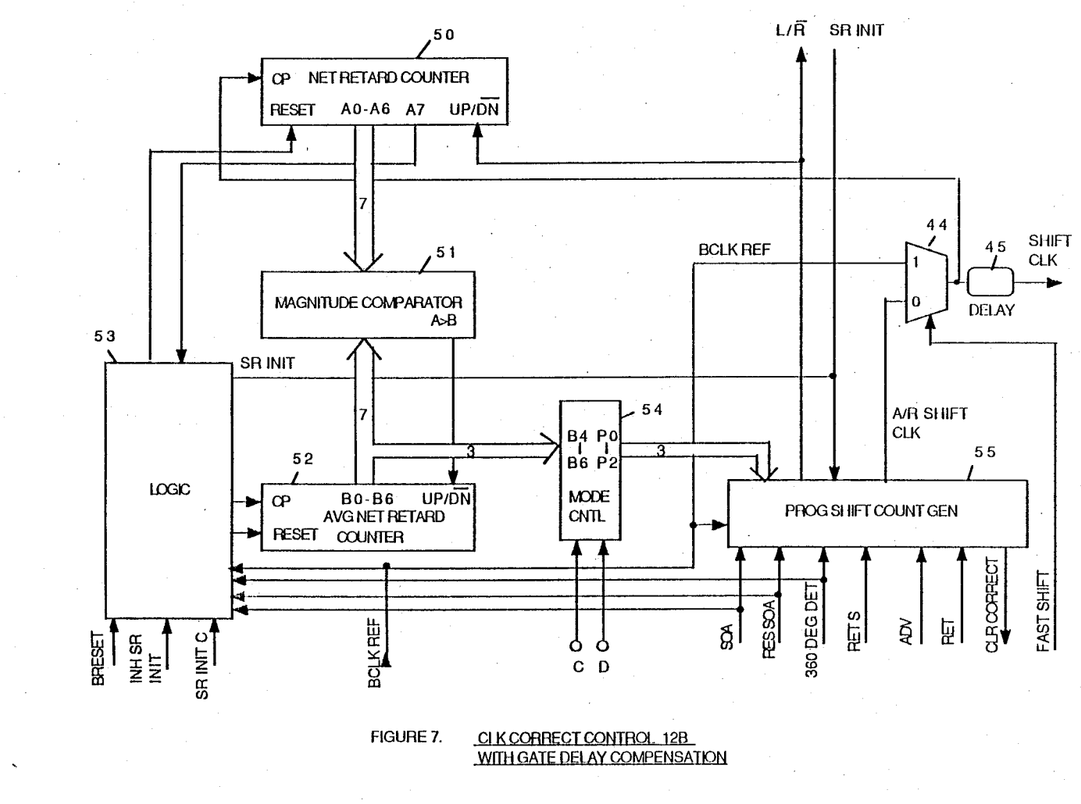
FIG. 7 a clock control circuit with gate delay compensation in accordance with a feature of the present invention.

FIG. 7 shows a block diagram of a clock correct control circuit with gate delay compensation (12B). This clock correct control circuit can be used in place of the circuit 12 shown in FIG. 3 to provide the additional features of gate delay compensation, bandwidth mode control, and shift register 11 all zero's recovery.

Gate delay compensation reduces the worst case min-max dT correction range to 1:2 or better by using multiple dT corrections to build up the minimum dT correction. Bandwidth mode control allows control over the min-max correction range. Shift register 11 all zero's recovery prevents an all zero's lock-up state.

Gate delay compensation of the phase-lock loop is required in many applications to provide a tighter tolerance correction. Since there is no high frequency reference to base each correction on, as in a conventional digital phase-lock loop, another approach must be taken. First the average selector propagation delay can be determined by counting the number of net retard shifts necessary to provide one CLK REF period delay. The average selector delay is then just the CLK REF period divided by this count. The desired minimum correction time is divided by this average selector delay to provide the number of dT corrections necessary to achieve this time. The minimum correction time must be greater than one-half the maximum dT correction. The worst case correction time accuracy covers a 1:2 min-max range regardless of the IC gate delay variation. The following equations summarize the above description and illustrate how the division operation can be simplified.

$$\frac{\text{CLK REF PERIOD}}{\text{AVG NET RET COUNT}} = \text{AVG SELECTOR DELAY} \quad \text{Eq. (1)}$$

$$\text{INT} \frac{(\text{MIN CORRECT TIME})}{(\text{AVG SELECTOR DELAY})} + 1 = \quad \text{Eq. (2)}$$

NO. OF dT CORRECTIONS

Substituting Eq. (1) for the average selector delay of Eq. (2):

$$\text{Eq. (3)}$$

$$\text{INT} \frac{(\text{MIN CORRECT TIME} * \text{AVG NET RET COUNT})}{(\text{CLK REF PERIOD})} +$$

1 = NO. OF dT CORRECTIONS

INT(x/y) means the integer portion only of x/y after the division. To simplify the division implementation, the desired minimum correction time should be chosen to yield a ½**n result for MIN CORRECT TIME/CLK REF PERIOD in Eq. (3) where n is an integer. Simple binary division of AVG NET RET COUNT can then be performed by shifting left n times toward the most significant bit.

The block diagram of FIG. 7 illustrates a technique which uses binary division to compensate for gate delay variations. Average net retard counter 52 holds the average number of shift register 11 shift left-minus-right clocks required to go from 0 to 360 degree delay. This up/down counter is incremented or decremented one count each time SR INIT or RES SOA occurs via logic 53. Just before SR INIT or RES SOA occurs, the net retard counter 50 count A is compared to the average net retard counter count B by magnitude comparator 51. If A>B, then the average net retard count is incremented, otherwise it is decremented. The three most significant bits of the average net retard count (B6–B4) are provided to a mode control circuit 54. A binary divide-by-16 of B6–B0 is accomplished by using only B6–B4 which is equivalent to shifting left four bits.

The mode control circuit maps B6–B4 to P2–P0 based on the C and D inputs. B6–B4 is passed straight through (CD=11), divided by 2 (CD=10), divided by 4 (CD=01), or divided by 8(CD=00). Divide by 8 just results in P2=P1=P0=0 which is the narrowband mode 0. A programmable shift count generator 55 translates the P2-P0 input to the appropriate number of shift clocks for each phase advance or phase retard request. The binary count of P2-P0 plus 1 equals the number of shift clocks. Mode 0 is equivalent to no gate delay compensation since only one shift clock occurs for each correction.

The clock correct control circuit of FIG. 7 can also be used in mode 0 for the Manchester data or ISDN LT clock recovery applications. Gate delay compensation is not required for either of these applications since even the worst case minimum phase step is still sufficient to track the data.

If 128 net retards have occured with no SR INIT or RES SOA, then shift register 11 must be in an undesired "all zero's" state. In this state A7 goes high and via logic 53 generates an SR INIT and resets the two counters 50 and 52. This action ensures recovery from all zero's in shift register 11.

The SOA sequencer used with the clock correct control circuit 12 B requires a special power-up circuit. This circuit quickly establishes the correct average net retard count even with a limited data transition source which is close in frequency to CLK REF. This start-up circuit forces the fast shift mode for 128×128=16,384 periods of CLK REF. This allows sufficient shift clocks to update the average net retard counter to its full count with a worst case minimum selector delay.

The circuit of FIG. 7 is based on a range of 0.8 to 7.2 nsec selector delays and a minimum CLK REF frequency of 10 Mhz. The counter sizes, mode control operation and programmable shift count generator can be modified for other applications.

A clock recovery application for an ISDN U interface at the network terminal (NT) illustrates the technique used for gate delay compensation and mode control. Requirements are similar to clock recovery at the line terminal (LT), except that a minimum correction of about 6 nsec is required to track the data under minimum transition and maximum jitter conditions. A maximum of 12.2 nsec results due to the worst case 1 to 2 range for gate delay compensation. This is still less than the maximum correction limit of about 1/1000 baud period (12.5 nsec).

Substituting in the first fraction of Eq. (3):

$$\frac{\text{MIN CORRECT TIME}}{\text{CLK REF PERIOD}} = \frac{6 \text{ nsec}}{97.652 \text{ nsec}} = \frac{1}{16.2}$$

Then approximate 1/16.2 with 1/16=½**4 to allow division to be implemented by a shift left 4× and substitute in Eq. (3):

INT(1/16* AVG RET COUNT)+1=NO. OF dT CORRECTIONS

Table 1 shows the max and min average selector delay (dT), B6 B5 B4 and the no. of dT corrections for any average retard count from 0 to 127. This table is derived from Eq. (1) and the above.

Tables 2A through 2D show B6 B5 B4, P2 P1 P0, the number of shift clocks per retard request and the correct time for modes 0, 1, 2 and 3. Mode 0 is equivalent to clock correct control circuit 12A in FIG. 3 since only one shift clock is generated per retard request regardless of the average selector delay. The mode 0 correct time range is 0.769 to 7.2 nsec which is a 1:9.4 range.

Modes 1 to 3 reduce the correction time range by increasing the minimum correction time:

Mode 0 = .769–7.2 nsec, 1:9.4
Mode 1 = 1.538–7.2 nsec, 1:4.7
Mode 2 = 3.076–7.2 nsec, 1:2.3
Mode 3 = 6.152–12.2 nsec, 1:2

The mode 3 correction time range meets the requirements for clock recovery at the network terminal.

TABLE 1

| AVG RET COUNT | AVG SELECTOR DELAY MAX (ns) | AVG SELECTOR DELAY MIN (ns) | B6 | B5 | B4 | NO. OF dT CORRECTS |
|---|---|---|---|---|---|---|
| 0–15 | — | 6.510 | 0 | 0 | 0 | 1 |
| 16–31 | 6.100 | 3.150 | 0 | 0 | 1 | 2 |
| 32–47 | 3.052 | 2.078 | 0 | 1 | 0 | 3 |
| 48–63 | 2.035 | 1.550 | 0 | 1 | 1 | 4 |
| 64–79 | 1.526 | 1.236 | 1 | 0 | 0 | 5 |
| 80–95 | 1.221 | 1.028 | 1 | 0 | 1 | 6 |
| 96–111 | 1.017 | .880 | 1 | 1 | 0 | 7 |
| 112–127 | .872 | .769 | 1 | 1 | 1 | 8 |

TABLE 2A
(Mode 0, AB = 00)

| B6 | B5 | B4 | P2 | P1 | P0 | SHIFT CLKS | CORRECT TIME MAX (ns) | CORRECT TIME MIN (ns) |
|---|---|---|---|---|---|---|---|---|
| 0 | 0 | 0 | 0 | 0 | 0 | 1 | (7.2) | 6.510 |
| 0 | 0 | 1 | 0 | 0 | 0 | 1 | 6.100 | 3.150 |
| 0 | 1 | 0 | 0 | 0 | 0 | 1 | 3.052 | 2.078 |
| 0 | 1 | 1 | 0 | 0 | 0 | 1 | 2.035 | 1.550 |
| 1 | 0 | 0 | 0 | 0 | 0 | 1 | 1.526 | 1.236 |
| 1 | 0 | 1 | 0 | 0 | 0 | 1 | 1.221 | 1.028 |
| 1 | 1 | 0 | 0 | 0 | 0 | 1 | 1.017 | .880 |
| 1 | 1 | 1 | 0 | 0 | 0 | 1 | .872 | .769 |

TABLE 2B
(Mode 1, AB = 01)

| B6 | B5 | B4 | P2 | P1 | P0 | SHIFT CLKS | CORRECT TIME MAX (ns) | CORRECT TIME MIN (ns) |
|---|---|---|---|---|---|---|---|---|
| 0 | 0 | 0 | 0 | 0 | 0 | 1 | (7.2) | 6.510 |
| 0 | 0 | 1 | 0 | 0 | 0 | 1 | 6.100 | 3.150 |
| 0 | 1 | 0 | 0 | 0 | 0 | 1 | 3.052 | 2.078 |
| 0 | 1 | 1 | 0 | 0 | 0 | 1 | 2.035 | 1.550 |
| 1 | 0 | 0 | 0 | 0 | 1 | 2 | 3.052 | 2.472 |
| 1 | 0 | 1 | 0 | 0 | 1 | 2 | 2.442 | 2.056 |
| 1 | 1 | 0 | 0 | 0 | 1 | 2 | 2.034 | 1.760 |
| 1 | 1 | 1 | 0 | 0 | 1 | 2 | 1.744 | 1.538 |

TABLE 2C
(Mode 2, AB = 10)

| B6 | B5 | B4 | P2 | P1 | P0 | SHIFT CLKS | CORRECT TIME MAX (ns) | CORRECT TIME MIN (ns) |
|---|---|---|---|---|---|---|---|---|
| 0 | 0 | 0 | 0 | 0 | 0 | 1 | (7.2) | 6.510 |
| 0 | 0 | 1 | 0 | 0 | 0 | 1 | 6.100 | 3.150 |
| 0 | 1 | 0 | 0 | 0 | 1 | 2 | 6.104 | 4.156 |
| 0 | 1 | 1 | 0 | 0 | 1 | 2 | 4.070 | 3.100 |
| 1 | 0 | 0 | 0 | 1 | 0 | 3 | 4.578 | 3.708 |
| 1 | 0 | 1 | 0 | 1 | 0 | 3 | 3.663 | 3.084 |
| 1 | 1 | 0 | 0 | 1 | 1 | 4 | 4.068 | 3.520 |
| 1 | 1 | 1 | 0 | 1 | 1 | 4 | 3.488 | 3.076 |

TABLE 2D
(Mode 3, AB = 11)

| B6 | B5 | B4 | P2 | P1 | P0 | SHIFT CLKS | CORRECT TIME MAX (ns) | CORRECT TIME MIN (ns) |
|---|---|---|---|---|---|---|---|---|
| 0 | 0 | 0 | 0 | 0 | 0 | 1 | (7.2) | 6.510 |

TABLE 2D-continued (Mode 3, AB = 11)

| B6 | B5 | B4 | P2 | P1 | P0 | SHIFT CLKS | CORRECT TIME MAX (ns) | CORRECT TIME MIN (ns) |
|---|---|---|---|---|---|---|---|---|
| 0 | 0 | 1 | 0 | 0 | 1 | 2 | 12.200 | 6.300 |
| 0 | 1 | 0 | 0 | 1 | 0 | 3 | 9.156 | 6.234 |
| 0 | 1 | 1 | 0 | 1 | 1 | 4 | 8.140 | 6.200 |
| 1 | 0 | 0 | 1 | 0 | 0 | 5 | 7.630 | 6.180 |
| 1 | 0 | 1 | 1 | 0 | 1 | 6 | 7.326 | 6.168 |
| 1 | 1 | 0 | 1 | 1 | 0 | 7 | 7.119 | 6.160 |
| 1 | 1 | 1 | 1 | 1 | 1 | 8 | 6.976 | 6.152 |

While the present invention has been described in connection with a preferred embodiment thereof, other embodiments and applications will become apparent to those skilled in the art. For example, an alternative implementation of the center frequency high resolution digital phase locked loop reduces the 360 degree search time after SOA occurs. This consists of initializing shift register 11 only on power up. Retard corrections occur as described earlier except that shift register 11 R2-Rn reset inputs are never pulsed during SR INIT, only S1 and S0. During phase advance corrections, a pair of logic "1's" are injected at the left end of shift register 11 at SRD based on the average net phase retard count. Each time SOA occurs, a pair of logic "1's" will be near 360 degrees of phase delay and an advance-retard search algorithm locates 360 degrees. In this approach it is difficult to recover from undesired shift register states.

There are many other applications of the invention besides the low speed optic fiber and ISDN clock recovery circuits described herein. High speed fiber optic data and clock recovery circuits can also be implemented if high speed IC technology is used. For example a 500 Mbit/sec NRZ clock recovery circuit could be designed using a 500 Mhz CLK REF input to a gallium arsenide IC implementation of the invention. On-chip 100 psec selector delays would provide a resolution of 20 samples per bit. A conventional digital phase locked loop would require a very high 10 Ghz CLK REF input. The invention can be used in any application where a DPLL can be used without the requirement of a high frequency reference. A T1 1.544 Mhz clock recovery circuit can also be implemented using the invention with an appropriate phase detector and gate delay compensated correction time.

The invention can also be used to implement a delay line with delay based on a clock reference. The delay is established by a Programmable percentage of the average net retard count. IC process delay variations are compensated for upon initialization, and periodic calibration cycles compensate for temperature and voltage changes. The foregoing is all included within the spirit and scope of the invention as set forth by the claims appended hereto.

I claim:

1. A center frequency high resolution digital phase-lock loop circuit comprising:
   digital phase correction means, having coupled thereto an input clock reference signal with a frequency f, and coupled therefrom a clock output phase-locked frequency, where f, is centered at said output phase locked frequency;
   divided-by-K circuit means for dividing said clock output phase-locked frequency by an integer K, to derive a data receive clock phase-locked to incoming data transitions;
   phase detector means having said data receive clock and said incoming data coupled thereto for generating phase correction signals whenever said data receive clock does not coincide in time with said incoming data transitions, and for coupling said phase correction signals to said digital phase correction means to selectively introduce a fixed delay in said clock output phase locked frequency, such that said clock output phase locked frequency equals said clock reference signal frequency;
   said phase detector means including means for generating phase correction signals which are either phase advance or phase retard signals respectively, when said data receive clock is either late or early, respectively, with respect to said incoming data transitions;
   wherein said digital phase correction means includes means for resetting said phase advance or phase retard signals after the phase of said clock output signal is corrected and a digital delay line means for providing an incremental delay from 0 to 360 degrees of the period of said clock reference signal; and
   shift register means for selecting a desired incremental delay from said delay line; and
   clock correction control means for controlling said shift register means in accordance with said phase advance and phase retard signals to select said incremental delay from said delay line.

2. A center frequency high resolution digital phase-lock loop circuit in accordance with claim 1 wherein said input clock reference frequency f, is equal to the frequency of said incoming data transitions.

3. A center frequency high resolution digital phase-lock loop circuit in accordance with claim 1 wherein:
   the smallest increment of said incremental delay is the propagation delay of two serially connected logic gates in said digital delay line.

4. A center frequency high resolution digital phase-lock loop circuit in accordance with claim 3 wherein said logic gates are NAND gates.

5. A center frequency high resolution digital phase-lock loop circuit in accordance with claim 3 wherein the number of incremental delays is selectable from 0 to n, where n is greater than the clock reference signal period divided by said smallest increment of incremental delay.

6. A center frequency high resolution digital phase-lock loop circuit in accordance with claim 1, further comprising:
   three hundred sixty degree phase detection circuit means for initializing said shift register means when the output of said digital delay line has been phase retarded by 360 degrees, such that said digital delay line functions as an infinite delay line while providing only one clock period of actual delay.

7. A center frequency high resolution digital phase-lock loop circuit in accordance with claim 6, further comprising:
   shift overrun advance detector means for detecting phase advance overshoot condition, and for overriding phase correction signals in response to sequencer control signals; and
   shift overrun advance sequencer means for generating said sequencer control signals to enable a selector means to modify the clock output frequency to compensate for said phase advance overshoot condition, such that an apparent infinite delay line is provided for both phase advance and phase retard corrections.

8. A center frequency high resolution digital phase-lock loop circuit in accordance with claim 7 wherein said phase correction means includes:
   means for providing a digital delay line reset;
   means for providing phase retard correction signals from 0 to 180 degrees;
   means for providing phase retard correction signals from 180 degrees to 360 degrees;
   means for providing phase advance correction signals from 0 to 180 degrees;
   means for providing phase advance correction signals from 180 to 360 degrees.

9. A center frequency high resolution digital phase-lock loop circuit in accordance with claim 8, including:
   inhibit circuit means for tracking gate delay variations when no shift clocks are present.

10. A center frequency high resolution center frequency digital phase-lock loop circuit in accordance with claim 1, further comprising:
   buffer amplifier means for providing a buffered clock reference to drive said digital delay line.

11. A center frequency high resolution digital phase-lock loop circuit in accordance with claim 1 wherein:
   said digital delay line is comprised of a serial chain of non-inverting NAND or equivalent logic gates.

12. A center frequency high resolution digital phase-lock loop circuit in accordance with claim 11 wherein said NAND or equivalent logic gates are implemented in CMOS technology.

13. A center frequency high resolution digital phase-lock loop circuit in accordance with claim 11 wherein said NAND or equivalent logic gates are implemented in gallium arsenide technology.

14. A center frequency high resolution digital phase-lock loop circuit in accordance with claim 11 including means whereby a pair of logical "ones" in said shift register means is shifted left or right to phase retard or phase advance, respectively an output clock from a serial chain of data selectors.

15. A center frequency high resolution digital phase-lock loop circuit in accordance with claim 1 wherein said incoming data is in the 2B1Q format.

16. A center frequency high resolution digital phase-lock loop circuit in accordance with claim 1 wherein said incoming data is in Manchester encoded format.

17. A center frequency high resolution digital phase-lock loop circuit in accordance with claim 1 wherein said phase detector means includes:
   means for centering the negative edge of a received clock between the data transitions of incoming data.

18. A center frequency high resolution digital phase-lock loop circuit in accordance with claim 1 wherein said output clock is coupled to a fiber optic clock recovery circuit for use in fiber optic data transmission.

19. A center frequency high resolution digital phase-lock loop circuit in accordance with claim 1 wherein said digital delay line includes means for providing delay as a programmable percentage of the average net phase retard count.

20. A center frequency high resolution digital phase-lock loop circuit in accordance with claim 1, wherein said clock correction control circuit means includes means for gate delay compensation.

21. A center frequency high resolution digital phase-lock loop circuit in accordance with claim 1, wherein said clock correction control circuit means includes means for bandwith mode control.

22. A center frequency high resolution digital phase-lock loop circuit in accordance with claim 1, wherein said clock correction control circuit means includes means for shift register all zeros recovery.

23. In an ISDN interface between a telephone central office line terminal and subscriber network terminals, a center frequency high resolution digital phase-lock loop circuit comprising:
   digital phase correction means, having coupled thereto an input clock reference signal with a frequency f, and coupled therefrom a clock output phase locked frequency, where f, is centered at said output phase locked frequency;
   divide-by-K circuit means for dividing said clock output phase-locked frequency by an integer K, to derive a data receive clock phase-locked to incoming data transitions, said incoming data being 2B1Q line code for providing zero crossing transition information;
   phase detector means having said data receive clock and said incoming data coupled thereto for generating phase correction signals whenever said data receive clock does not coincide in time with said incoming data transitions, and for coupling said phase corrections signals to said digital phase correction means to selectively introduce a predetermined delay in said clock output phase locked frequency, such that said clock output phase locked frequency equals said clock reference signal frequency and means for tracking phase shifts in said incoming data due to cable temperature varialtions, while not following high frequency jitter.

24. In an ISDN interface in accordance with claim 23, wherein said means for tracking phase shifts includes:
   an averaging phase advance-phase retard counter for deriving correction requests once every several seconds.

* * * * *